United States Patent
Duval et al.

(10) Patent No.: US 7,597,804 B2
(45) Date of Patent: Oct. 6, 2009

(54) OPTICALLY ACTIVE SUPPORT MATERIALS, THEIR METHOD OF PREPARATION AND THEIR USES

(75) Inventors: Raphaël Duval, Deauville (FR); Hubert Leveque, Lillebonne (FR)

(73) Assignee: EKA Chemicals, Bohus (SE)

( * ) Notice: Subject to any disclaimer, the term of this patent is extended or adjusted under 35 U.S.C. 154(b) by 154 days.

(21) Appl. No.: 10/876,777

(22) Filed: Jun. 28, 2004

(65) Prior Publication Data

US 2005/0209100 A1    Sep. 22, 2005

Related U.S. Application Data

(63) Continuation of application No. PCT/FR02/04391, filed on Dec. 17, 2002.

(51) Int. Cl.
*B01D 15/08* (2006.01)
(52) U.S. Cl. .................. 210/198.2; 210/502.1; 210/635; 210/656
(58) Field of Classification Search .............. 210/198.2, 210/635, 656, 659, 502.1; 502/401, 404
See application file for complete search history.

(56) References Cited

U.S. PATENT DOCUMENTS

| | | | |
|---|---|---|---|
| 4,045,353 A * | 8/1977 | Kosaka et al. ................. 502/62 |
| 4,335,017 A * | 6/1982 | Miles et al. ..................... 502/7 |
| 4,694,044 A * | 9/1987 | Kiniwa ........................ 525/178 |
| 4,724,207 A * | 2/1988 | Hou et al. .................... 435/180 |
| 4,786,415 A * | 11/1988 | Shibata et al. ............... 210/635 |
| 4,818,394 A * | 4/1989 | Okamoto et al. .......... 210/198.2 |
| 4,861,872 A * | 8/1989 | Okamoto et al. ............ 536/18.7 |
| 5,075,371 A * | 12/1991 | Boschetti et al. ............ 524/791 |
| 5,268,097 A * | 12/1993 | Girot et al. ................ 210/198.2 |
| 5,302,633 A * | 4/1994 | Kimata et al. ................ 523/218 |
| 5,502,022 A * | 3/1996 | Schwarz et al. ............. 502/401 |
| 5,736,259 A * | 4/1998 | Oda et al. .................... 428/532 |
| 5,811,532 A | 9/1998 | House |
| 6,011,149 A | 1/2000 | Francotte |
| 6,042,723 A | 3/2000 | Duval et al. |
| 6,217,769 B1 * | 4/2001 | Okamoto et al. ............ 210/635 |
| 6,277,782 B1 * | 8/2001 | Moller et al. ................ 502/402 |
| 6,342,592 B1 | 1/2002 | Duval et al. |
| 6,346,616 B1 | 2/2002 | Duval |
| 6,610,630 B2 * | 8/2003 | Schwarz et al. ............. 502/401 |
| 2001/0014649 A1 * | 8/2001 | Schwarz et al. ............. 502/401 |
| 2001/0029282 A1 | 10/2001 | Duval |
| 2003/0125529 A1 * | 7/2003 | Boschetti et al. ............ 530/417 |

FOREIGN PATENT DOCUMENTS

| | | |
|---|---|---|
| EP | 0147804 | 7/1985 |
| EP | 0155637 | 9/1985 |
| EP | 0157365 | 10/1985 |
| EP | 0281951 A1 | 9/1988 |
| EP | 0656331 B1 | 6/1995 |
| EP | 0656333 A1 | 6/1995 |
| EP | 0747341 A1 | 12/1996 |
| EP | 0957358 A1 | 11/1999 |
| EP | 0985682 A1 | 3/2000 |
| JP | 62-278450 | 12/1987 |
| JP | 07-225225 | 8/1995 |
| JP | 07-328305 | 12/1995 |
| JP | 09-194399 | 7/1997 |
| JP | 2001-296288 A | 10/2001 |
| WO | WO 96/27615 | 9/1996 |
| WO | WO 97/04011 | 2/1997 |

OTHER PUBLICATIONS

Chemical Reviews, 1998, vol. 98, No. 5, pp. 1745 and 1780.
Martel et al, "Preparation and sorption properties of a beta-cyclodextrin-linked chitosan derivative", Journal of Polymer Science, vol. 39, No. 1, pp. 169-176.
Abstract of Journal of Chematography A, 839, 15-21, 1999.
International Search Report, completed Jun. 26, 2003.
Abstract of JP 01216943.
Abstract of JP 07330802.
Abstract of JP 06308108.
Abstract of JP 01199643.
Patent Abstracts of Japan abstracting JP 62-278450.
Patent Abstracts of Japan abstracting JP 07-225225.
Patent Abstracts of Japan abstracting JP 07-328305.
Patent Abstracts of Japan abstracting JP 09-194399.
Patent Abstracts of Japan abstracting JP 2001-296288A.
English translation of a Final Office Action issued by the JPO on Mar. 4, 2008.

* cited by examiner

*Primary Examiner*—Ernest G Therkorn
(74) *Attorney, Agent, or Firm*—David J. Serbin; Robert C. Morriss

(57) ABSTRACT

This invention relates to optically active support materials which include one or more esters and/or one or more carbamates and/or one or more mixed ester and carbamate compounds of polysaccharide or oligosaccharide, and an organic and/or inorganic substrate.

10 Claims, No Drawings

OPTICALLY ACTIVE SUPPORT MATERIALS, THEIR METHOD OF PREPARATION AND THEIR USES

REFERENCE TO RELATED APPLICATIONS

This application is a continuation of PCT/FR02/04391 filed Dec. 17, 2002.

The present invention relates to optically active support materials (supports), consisting of one or more esters and/or one or more carbamates and/or one or more mixed ester and carbamate compounds of polysaccharide or of oligosaccharide, and an organic and/or inorganic substrate.

The invention also relates to their method of preparation as well as their uses for optical enrichment of chiral molecules, and more particularly for the separation of enantiomers by liquid, supercritical, gas or gas-liquid chromatography.

When used in chromatography, the supports of the invention, also called enantioselective chromatographic supports, constitute unichiral stationary phases, or CSPs (chiral stationary phases), which are also called enantioselective, or optically active, stationary phases, and the technique used is then called chiral or enantioselective chromatography.

There has been rapid growth in the use of enantioselective chromatography during the last twenty years, both for applications in analysis, and for the industrial-scale preparation, of pharmaceutical molecules that are unichiral, or optically active of high enantiomeric purity.

In fact, since the Thalidomide tragedy in the 1960s, the Health Authorities of the industrialized countries have gradually imposed statutory constraints on pharmaceutical manufacturers, who must in future support their Marketing Authorization Dossier for their new medicinal products with comparative pharmacological and toxicological data for each enantiomer present or potentially present, in the future medicinal product.

Among the various CSPs that have been subject to industrial and commercial development, polysaccharides derivatives, notably the esters and carbamates derivatives which are described in patents EP 0147 804, EP 0 155 637, EP281951 and EP157365 for example, have been the object of numerous applications.

In this connection, the field of application of CSPs based on polysaccharides ester and carbamate derivatives, although very wide in terms of chromatographic resolution of molecules with extremely varied chemical structures, is limited by the fact that said polysaccharides ester and carbamate derivatives are physically applied onto and/or bound covalently to silica.

The limitations arise from the chemical stability of silica, and more particularly of silica gels, which are soluble in basic aqueous media and in the presence of fluoride ions.

EP957358 describes chiral stationary phases whose performance is improved by the presence of a residual quantity of deposition solvent on the solid support.

Carr and coworkers tried to solve this problem by replacing silica gel with zirconia. Cecilia B. Castells, Ilya Tsukerman and Peter W. Carr used zirconia as substrate, on which an ester or carbamate derivative of cellulose or of amylose was deposited (poster 1899 P presented at the Pittsburgh Conference '99 at Orlando, Fla., USA from 7 to 12 Mar. 1999). However, the advantages in terms of chemical stability and enantioselectivity of the CSPs obtained were not demonstrated clearly, and in particular no data comparing them with silica gels were presented.

House D., in U.S. Pat. No. 5,811,532, described chiral stationary phases of polysaccharide or polysaccharide derivative type, bound covalently via a "spacer" to the hydroxyl groups present on the surface of the refractory inorganic oxide used as substrate. Nevertheless, the only substrate exemplified was silica and no data for comparison with other substrates was offered.

There is a real need for new CSPs that will make it possible to separate more and more complex mixtures of optical isomers, in increasingly severe chromatographic conditions, since some compounds are only soluble in alkaline medium.

There is, moreover, an advantage in having CSPs that offer improved enrichment capacities relative to those known hitherto, this capacity being measured by the enantioselectivity factor, also called selectivity factor $\alpha$ for chromatographic separations of chiral molecules.

Following long and extensive research, the Applicant found, quite surprisingly and unexpectedly, that the chemical nature of the substrate on which a polysaccharide ester or carbamate derivative is placed in order to form an enantioselective chromatographic support, or CSP, has a direct influence on the enantioselectivity factor of the CSP thus obtained.

According to the invention it is possible, starting from one and the same ester derivative, or several ester derivatives, or alternatively from one or more carbamate derivatives, or yet again from one or more mixed ester and carbamate derivatives of an oligosaccharide or of a polysaccharide, to obtain an entire range of different CSPs, made from substrate materials of different chemical nature, and displaying a different enantioselectivity factor with respect to one and the same racemic molecule, or one and the same mixture of enantiomers to be separated.

There is a quite substantial industrial advantage in having CSPs that are made from substrates of different chemical nature, so as to be able to determine, for a wide range of CSPs synthesized according to the invention, which CSP offers both the best enantioselectivity, and possibly the best productivity when preparative applications are envisaged.

The synthesis of polysaccharides ester or carbamate derivatives, as well as their physical deposit onto silica gel to constitute a CSP, and their use in chromatographic resolution of chiral molecules, is known per se. It was described for example in patents EP 0 147 804, EP 155 637, EP281951 and EP157365.

The physical deposing of said derivatives of polysaccharides on a zirconia support was described by Carr and uses the same method as that described in the patents cited above. The results presented by Carr do not demonstrate any superiority of the CSPs based on zirconia, compared with identical CSPs made from silica gel.

Surprisingly, no other research, to the best of our knowledge, has been conducted into the synthesis of CSPs based on substrates other than silica and zirconia, with ester or carbamate derivatives of polysaccharides or oligosaccharides physically deposited onto them. However, we must mention patent application PCT/EP 96/00773 (WO96 27615), which describes in very general terms and claims polymerizable polysaccharide derivatives deposited on silica gel, alumina, graphite or zirconium oxide. None of the examples in said patent application describes CSPs having alumina, zirconium oxide or graphite as substrates. Therefore the effectiveness of these CSPs is not proved and the enantioselectivity of these CSPs has not been compared with those of CSPs having silica gels as substrate.

Quite surprisingly, the Applicant found that new enantioselective chromatographic supports according to the invention, consisting of ester or carbamate derivatives, or of mixed ester and carbamate derivatives of polysaccharides and of oligosaccharides, and organic and/or inorganic substrates, not used conventionally, displayed improved enantioselectivity factors relative to the homologous CSPs consisting of silica gel in particular.

The invention therefore relates to an optically active support made up of one or more ester derivatives, and/or of one or more carbamate derivatives, and/or of one or more mixed ester and carbamate derivatives of polysaccharides or of oligosaccharides, and of a solid substrate of organic and/or inorganic origin, said solid substrate not being able to be selected from the group comprising silica gel, alumina, magnesia, titanium dioxide, glass, kaolin, silicates, chromium oxide, boron oxide, zirconia, clay, polyvinyl alcohols, carbon, polyamide, polystyrene, polyacrylate and polyacrylamide.

When the solid substrate is of organic origin, it is an organic polymer selected from the group comprising notably poly(substituted styrenes), polyolefins, polyvinyl ethers, polyalkylvinyl ketones, polyalkynes, polyisocyanates, polyisonitriles, polyoxiranes, polythiiranes, polyaziridines, polyesters, polythioesters, polyurethanes, polyureas, polysulfonamides, phenol/formaldehyde resins, polyacenaphthylene, poly(acrylamide-co-acrylic acid), poly-(acrylamide-co-diallyl dimethyl ammonium chloride), poly-(2-acrylamido-2-methyl-1-propanesulfonic acid), poly-(2-acrylamido-2-methyl-1-propanesulfonic acid-co-acrylonitrile), poly(2-acrylamido-2-methyl-1-propanesulfonic acid-co-styrene), poly(acrylic acid), poly(acrylic acid-co-acrylamide), poly(acrylic acid-co-maleic acid), poly(acrylic acid)poly(ethylene oxide) grafted and crosslinked, net-polyacrylic-inter-net polysiloxane, polyacrylonitrile, poly(acrylonitrile-co-butadiene), poly(acrylonitrile-co-butadiene-co-acrylic acid), poly(acrylonitrile-co-butadiene-co-styrene), poly(acrylonitrile-co-methacrylonitrile), poly(acrylonitrile-co-methylacrylate), poly-(acrylonitrile-co-vinylidenechloride-co-methylmethacrylate), poly(allylamine, poly(amide-imide), polyaniline, poly(aspartic acid), poly(azelaic anhydride), polyaziridine, poly(benzyl methacrylate), poly(bisphenol A carbonate), poly(bisphenol A-co-epichlorohydrin), poly(4-bromostyrene), poly(1-butene), poly(tert-butyl acrylate-co-ethylacrylate-co-methacrylic acid), poly(1,4-butylene adipate), poly(1,4-butylene terephthalate), poly(butylene terephthalate-co-poly(alkylene glycol) terephthalate), poly (butyl methacrylate), poly(butylmethacrylate-co-methylmethacrylate), polycaprolactam, polycaprolactone, polycarbomethylsilane, poly(chlorotrifluoroethylene), poly-(1,4-cyclohexane dimethylene terephthalate-co-ethylene terephthalate), poly(diallyl-isophthalate), poly-(4,5-difluoro-2,2-bis-(trifluoromethyl)-1,3-dioxolo-co-tetrafluoroethylene), poly-(2,6-dimethyl-1,4-phenylene oxide), polyethylene, poly(ethylene-co-acrylic acid), poly(ethylene-co-ethyl acrylate), poly(ethylene-co-ethyl acrylate-co-maleic anhydride), poly(ethylene-co-glycidyl methacrylate), poly(ethylene glycol-co-bisphenol A diglycidyl ether), polyethylene grafted maleic anhydride, poly-(ethylene-co-methacrylic acid), poly-(ethylene-co-methyl acrylate), poly (ethylene-co-methyl acrylate-co-acrylic acid), poly (ethylene-co-propylene), poly(ethylene terephthalate), poly (ethylene-co-tetrafluoroethylene), poly(ethylene-co-vinyl acetate), poly(ethylene-co-vinyl acetate-co-methacrylic acid), poly(4-ethyl styrene-co-divinyl benzene), poly(1-hexa decene sulfone), poly(2-hydroxy ethyl methacrylate), poly (3-hydroxy butyric acid-co-3-hydroxyvaleric acid), poly(indene-co-coumarone), poly(lauryl lactam-block-poly tetrahydrofuran), poly-(lauryl methacrylate-co-ethylene glycol dimethacrylate), poly(methyl methacrylate-co-ethylene glycol dimethacrylate, poly(α-methylstyrene), poly(4-methyl styrene), poly(methylvinyl ether alternate maleic acid), poly (methylvinyl ether alternate maleic anhydride) crosslinked with 1,9-decadiene, poly-norbornene, poly(1,4-phenylene ether-ether-sulfone), poly(1,4-phenylene sulfide), poly(propylene-co-ethylene), poly(styrene-co-acrylonitrile), poly (styrene-co-4-bromostyrene-co-divinylbenzene), poly(styrene-co-divinyl benzene), poly(styrene-co-vinylbenzylamine-co-divinylbenzene), poly(styrene-co-vinyl benzyl chloride-co-divinylbenzene), polysulfone, polytetrafluoroethylene, poly(vinyl acetate), poly(vinyl acetate-co-crotonic acid, poly(vinyl alcohol), poly(9-vinyl carbazole, poly(vinyl cinnamate), poly(vinyl formal), poly (vinylidene chloride-co-acrylonitrile-co-methyl methacrylate), poly(vinylidene chloride-co-methyl acrylate), poly(vinylidene-chloride-co-vinyl chloride), poly(vinylidene fluoride), poly(vinylidene fluoride-co-hexafluoro-propylene), poly(vinyl methyl ketone), poly(1-vinyl naphthalene, poly(vinyl phenyl ketone), poly(4-vinyl pyridine-co-styrene-co-divinylbenzene), polyvinylpyrrolidone, polyvinyl pyrrolidone-co-styrene-co-divinylbenzene), polyvinyltoluene, polyamide 6, polyamide 6 D, polyamide 6 DF, poly(vinyl alcohol-co-divinyl-ethylene urea), (2-bromoethyl)-polystyrene, [2-(6,6'-diethoxy hexanoyl amino)ethyl]-polystyrene, [2-(succinylamino)ethyl]-polystyrene, 2-[4(hydroxymethyl) phenoxy acetamido]-ethyl-polystyrene, (aminomethyl)-polystyrene, (aminoethyl)-polystyrene, poly[(4-maleidobutyramidomethyl)-styrene-co-divinylbenzene], poly[(2,3-dihydroxy 1-propyl thiomethyl thiomethyl)styrene-co-divinyl] benzene, poly(N-acryloyol-2-amino-2-hydroxyl-1,3-propanediol), polyacryloylmorpholines, polyacryloyltrihydroxymethylacrylamides and polydimethylacrylamides, polysaccharides such as cellulose, agarose, dextran, chitosan or their derivatives such as cellulose acetate or cellulose triacetate, crosslinked polysaccharides such as cellulose, agarose, dextran, cyclodextrins, chitosan, starch, or their derivatives, crosslinked with bifunctional agents such as epichlorohydrin, ethyleneglycol-diglycidylether, divinylsulfone or 2,3-dibromopropanol, as well as copolymers having a saccharide part such as polyacrylamide/agarose or allyldextran/agarose.

According to the present invention, the term "polymer" is used without distinction both for polymers and for copolymers.

When the solid substrate is of organic and inorganic origin, it can be selected from all existing types of composites with an organic and inorganic base, for example the silica/dextran or hydroxyapatite/agarose composites.

When the solid substrate is of inorganic origin, it is selected from the group comprising magnesium silicate, zeolites, diatomaceous earths, phosphates such as the phosphates of calcium, zirconium, titanium, hafnium, germanium, tin or lead, arsenates such as the arsenates of titanium, zirconium or tin, ceramics such as titanium oxide/magnesium oxide, alumina/silica, zirconia/silica ceramics, and apatites such as fluoroapatite or hydroxyapatite.

The substrates, whether of organic or inorganic origin, or of organic and inorganic origin simultaneously (composite) can be in the form of particles having a diameter from 1 μm to 10 mm and pores with an opening diameter from 1 to 4000 Å.

The ester or carbamate derivatives or the mixed ester and carbamate derivatives of polysaccharides and of oligosaccharides included in the composition of the optically active support according to the invention have the following general formula:

$$PS-(OZ)_n \qquad (I)$$

where

PS represents a polysaccharide or an oligosaccharide having at least 6 oside units, n varies from 12 to 30 000, each OZ group can represent, independently of one another, OH, —O—C(O)—NH—R or —O—C(O)—R, with R representing an alkyl, aryl, alkaryl or aralkyl group having 1 to 40 carbon atoms, possibly substituted by at least one heteroatom selected from the group comprising notably sulfur, nitrogen, oxygen, phosphorus, chlorine, fluorine, bromine, iodine and silicon.

Thus, the compounds of formula (I) are polysaccharides or oligosaccharides PS—(OH)$_n$ in which all or some of the hydroxyl functions —OH have been replaced with carbamate functions —O—C(O)—NH—R or ester functions —O—C(O)—R, respectively by reaction with an isocyanate of general formula R—N=C=O or an acid halide of general formula R—C(O)—X, X being a halogen, preferably Cl.

Advantageously, in formula (I) above, R is selected from the group comprising phenyl, tolyl, 3,5-dimethylphenyl, 4-chlorophenyl, 3,5-dichlorophenyl and 4-tert-butylphenyl.

According to the invention, when PS in formula (I) represents a polysaccharide, it is selected from the group comprising notably cellulose, amylose, starch, and chitosan, with an average degree of polymerization from 20 to 10 000.

When PS represents an oligosaccharide, the latter is preferably selected from the group comprising the α, β and γ-cyclodextrins.

The optically active support according to the invention contains 2 to 70 wt. % of the ester or carbamate derivative or of the mixed ester and carbamate derivative of polysaccharide and of oligosaccharide, and 30 to 98 wt. % of said solid substrate.

According to a first embodiment, the ester derivative or derivatives, and/or the carbamate derivative or derivatives, and/or the mixed ester and carbamate derivative or derivatives of polysaccharide or of oligosaccharide are not bound covalently to the substrate of organic and/or inorganic origin and are not chemically bound together, i.e. are not crosslinked.

In the present description, the terms "bound by a covalent bond", "bound by a covalent chemical linkage" or "chemically bound" are used indiscriminately.

According to this first embodiment, the substrate of organic origin is one of the polymers mentioned above and can moreover be the polyamide or a polyvinyl alcohol.

When the substrate is of inorganic origin, in this first embodiment, it is as described above and can moreover be chromium oxide, boron oxide, aluminum silicate, clay and carbon.

The enantioselective supports according to this first embodiment are prepared by physical deposit of the ester or carbamate derivative or of the mixed ester and carbamate derivative of polysaccharide or of oligosaccharide on the solid substrate of organic and/or inorganic origin. This physical deposit can be carried out in two different ways, namely:

evaporation of a suspension, made from the solid substrate and a solution of said ester and/or carbamate derivative of polysaccharide or of oligosaccharide, at ordinary pressure or under vacuum, at room temperature or by heating, or gentle addition, to a suspension made from the solid substrate and a solution of said ester and/or carbamate derivative of polysaccharide or of oligosaccharide, of a non-solvent of the compound of formula (I) and isolation by filtration.

The invention also relates to a method of preparation of the optically active support according to the first embodiment described above that has successive steps comprising:

dissolving a compound of formula (I) in a protic or aprotic polar organic solvent, adding to the solution obtained, a solid substrate according to the invention, and perfectly homogenizing the suspension obtained, evaporating the solvent at ordinary pressure and/or under vacuum, at a temperature ranging from room temperature to about 100° C., or alternatively gently adding a non-solvent of the compound of formula (I) to the suspension obtained in the preceding step, drying the optically active support obtained, at room temperature or by heating, at ordinary pressure or under vacuum.

The preferred organic solvents of the ester and/or carbamate derivatives of polysaccharide or of oligosaccharide are tetrahydrofuran, 1,4-dioxan, pyridine, and the non-solvents preferred are heptane, hexane and the alkanes in general, alcohols and water.

Advantageously, when the substrate is of organic origin or simultaneously of organic and inorganic origin, the compound of general formula (I) is preferably dissolved in a protic solvent, so as not to dissolve or cause excessive swelling of the organic polymeric part, however, when the substrate is of inorganic origin, the compound of formula (I) is dissolved either in a protic or an aprotic polar organic solvent.

According to a second embodiment of the invention, the ester derivative or derivatives and/or the carbamate derivative or derivatives and/or the mixed ester and carbamate derivative or derivatives of polysaccharide or of oligosaccharide are bound by a covalent chemical bond onto a substrate of organic and/or inorganic origin, the solid substrate possibly having been chemically modified beforehand with a bifunctional agent. The solid substrate is chemically modified beforehand if it does not contain groups capable of forming covalent bonds with the ester or carbamate derivative or the mixed ester and carbamate derivative of polysaccharide or oligosaccharide.

In accordance with this second embodiment, the substrate of organic origin is one of the polymers mentioned above and can moreover be the polyamide or a polyvinyl alcohol.

When the substrate is of inorganic origin, in this second embodiment, it is as described above and can moreover be clay or carbon.

The enantioselective supports according to this second embodiment are prepared by a method as described previously that comprises in addition, before or after the drying step, a reaction step consisting of creating a covalent bond between the solid substrate and the ester and/or carbamate derivative or the mixed ester and carbamate derivative, as described in "Journal of Chromatography A, 839, 15-21, 1999".

According to a third embodiment, the ester derivative or derivatives and/or the carbamate derivative or derivatives and/or the mixed ester and carbamate derivative or derivatives of polysaccharide or of oligosaccharide are not covalently bound to the substrate of organic and/or inorganic origin but are chemically bound to one another, i.e. are crosslinked.

In accordance with this third embodiment, the substrate of organic origin is one of the polymers mentioned above and can moreover be the polyamide.

When the substrate is of inorganic origin, in this third embodiment, it is as described above and can moreover be aluminum silicate, chromium oxide or boron oxide.

The enantioselective supports according to this third embodiment are prepared by a method comprising the steps consisting of physically depositing the compounds of formula (I) onto a solid substrate that is inert with respect to the latter, i.e. a solid substrate that does not contain reactive functions allowing the creation of a covalent linkage with the compound of formula (I) as described in connection with the first embodiment, then polymerizing the compounds of formula (I) together, possibly with the aid of bi- or polyfunctional crosslinking agents.

The crosslinking step can be carried out using bifunctional agents as indicated in patents U.S. Pat. No. 6,342,592, EP0985681 and U.S. Pat. No. 5,302,633.

According to a fourth embodiment, the ester derivative or derivatives and/or the carbamate derivative or derivatives and/ or the mixed ester and carbamate derivative or derivatives of polysaccharide or of oligosaccharide are bound by a covalent chemical linkage to the substrate of organic and/or inorganic origin and are also chemically bound together, i.e. are crosslinked.

When the substrate is of inorganic origin, in this fourth embodiment, it is as described above and can moreover be aluminum silicate, chromium oxide or boron oxide.

The enantioselective supports according to this fourth embodiment are prepared by a method as described in connection with the first embodiment which includes in addition a step of formation of a covalent bond, and a crosslinking step, which are carried out in any order before or after the drying step.

The ester derivative or derivatives and/or the carbamate derivative or derivatives and/or the mixed ester and carbamate derivative or derivatives of polysaccharide or of oligosaccharide are fixed by covalent bonding to the solid substrate of organic and/or inorganic origin, as is described for example in "*Journal of chromatography A*, 839, 15-21, 1999".

They can be polymerized together or crosslinked by means of bifunctional agents as indicated in patents U.S. Pat. No. 6,342,592, EP 0985681, U.S. Pat. No. 5,302,633.

The invention also relates to the use of an optically active support for withdrawing, from a mixture of at least two constituents, selected from the group comprising the organic, inorganic or organic-inorganic molecules, at least a proportion of one of these constituents, or for separating said constituents by a chromatographic method.

It also relates to the use of the optically active support for withdrawing, from a mixture of at least two enantiomers, selected from the group comprising the organic, inorganic or organic-inorganic molecules, at least a proportion of one of these constituents, in order to enrich the mixture in one of the enantiomers and thus obtain the other enriched enantiomer, i.e. having a rotatory power greater than that of the initial mixture.

The invention also relates to the use of the optically active support for separating enantiomers by a chromatographic technique.

The invention is illustrated by the following examples, which are not limiting.

EXAMPLES

Examples I to VI illustrate the first embodiment of the enantioselective supports according to the invention.

Example I a/ Preparation of a cellulose tris-2,3,6-(3,5-dimethylphenyl)carbamate CDMPC Put 2.5 g of microcrystalline cellulose (average degree of polymerization n of 100), 75 ml of pyridine and 38 ml of heptane in a reactor. Stirring and heating under reflux permit dehydration of the cellulose by azeotropic entrainment. Add 8.15 g of 3,5-dimethylphenyl isocyanate and 0.05 g of dimethylaminopyridine and keep the medium under reflux for 24 hours. Cool the solution and pour it onto 100 ml of methanol. Wash the precipitate with 300 ml of methanol then dry it under vacuum at 50° C. (dry weight=6.5 g of CDMPC).

b/ Preparation of a Polyamide/CDMPC CSP

Sieve a polyamide substrate, sold by the company Merck under reference 32 121 232, between 15 and 40 µm. Then dissolve 0.45 g of CDMPC, prepared in step a/ above, in 40 ml of tetrahydrofuran (THF).

Add 3 g of previously sieved polyamide substrate to the above solution, and perfectly homogenize the suspension obtained, with stirring. Then slowly evaporate the THF at ordinary pressure then under vacuum until a perfectly dry and homogeneous powder is obtained. 3.45 g of polyamide/CDMPC CSP are obtained, and are used for filling a 250×4.6 mm HPLC column.

Insert the column in a HPLC system and then equilibrate the whole system in the following conditions:

temperature 20° C., elution flow rate 1 ml/min, detection wavelength 254 nm, eluting mobile phase variable (see results table), quantity of racemic mixture injected: 1 µg, injection loop of 25 µl, injection solvent ethanol.

With this column, carry out various separations of racemic solutes, and for each one measure the enantioselectivity α and state the mobile phase used. The results are given below:

| Racemic solute | Mobile phase | Enantioselectivity α |
|---|---|---|
| Trans-stilbene oxide | Heptane/isopropanol 90/10 | 1.50 |
| Flavanone | Heptane/isopropanol 90/10 | 1.29 |
| Benzoin | Heptane/isopropanol 90/10 | 1.44 |
| 2,2,2-trifluoro-1-(9-anthryl)ethanol | Chloroform 100% | 3.60 |
| Pindolol | NaClO$_4$ 1M/acetonitrile 60/40 | 1.90 |
| 1,1'-binaphthol | Diisopropyl ether 100% | 1.35 |

Example II a/ Preparation of a cellulose tris-2,3,6-(3,5-dichlorophenyl)carbamate CDCPC Put 2.5 g of microcrystalline cellulose (average degree of polymerization n of 100), 75 ml of pyridine and 38 ml of heptane in a reactor. Stirring and heating under reflux permit dehydration of the cellulose by azeotropic entrainment. Add 10.42 g of 3,5-dichlorophenyl isocyanate and 0.05 g of dimethylaminopyridine and keep the medium under reflux for 24 hours. Cool the solution and pour it onto 100 ml of methanol. Wash the precipitate with 300 ml of methanol then dry it under vacuum at 50° C.

b/ Preparation of a Polyamide/CDCPC CSP

Sieve a polyamide substrate, sold by the company Merck under reference 32 121 232, between 15 and 40 µm.

Then dissolve 0.45 g of CDCPC, prepared in step a/ above, in 40 ml of tetrahydrofuran (THF).

Add 3 g of polyamide substrate, prepared previously, to the above solution, and perfectly homogenize the suspension obtained, with stirring.

Then slowly evaporate the THF at ordinary pressure then under vacuum until a perfectly dry and homogeneous powder is obtained.

3.45 g of polyamide/CDCPC CSP are obtained, and are used for filling a 250×4.6 mm HPLC column.

Insert the column in a HPLC system and then equilibrate the whole system in the following conditions:
- temperature 20° C.,
- elution flow rate 1 ml/min,
- detection wavelength 254 nm,
- eluting mobile phase variable (see results table),
- quantity of racemic mixture injected: 1 µg,
- injection loop of 25 µl,
- injection solvent ethanol.

With this column, carry out various separations of racemic solutes, and for each one measure the enantioselectivity $\alpha$ and state the mobile phase used.

The results are given below:

| Racemic solute | Mobile phase | Enantioselectivity $\alpha$ |
|---|---|---|
| Trans-stilbene oxide | Heptane/isopropanol 90/10 | 1.87 |
| 2,2,2-Trifluoro-1-(9-anthryl)ethanol | Heptane/chloroform 50/50 | 1.58 |

Example III

Dry a silica/dextran composite substrate, 10 µm sold by the company Biosepra, at 150° C. under vacuum.

Then dissolve 0.45 g of cellulose tris-2,3,6-(3,5-dimethylphenyl)carbamate, or CDMPC, prepared in step a/ of example I, in 40 ml of tetrahydrofuran or THF.

Add 3 g of previously dried titanium substrate to the above solution, and perfectly homogenize the suspension obtained, with stirring.

Then gently pour 200 ml of heptane onto the suspension obtained previously.

After stirring for 2 hours, filter the suspension then wash it twice with 100 ml of heptane.

Dry the solid at ordinary pressure then under vacuum until a perfectly dry and homogeneous powder is obtained.

3.45 g of composite/CDMPC CSP are obtained, and are used for filling a 100×4.6 mm HPLC column.

Insert the column in an HPLC system and then equilibrate the whole system in the following conditions:
- temperature 20° C.,
- elution flow rate 1 ml/min,
- detection wavelength 254 nm,
- eluting mobile phase variable (see results table),
- quantity of racemic mixture injected: 1 µg,
- injection loop of 25 µl,
- injection solvent ethanol.

With this column, carry out various separations of racemic solutes, and for each one measure the enantioselectivity $\alpha$ and state the mobile phase used. The results are given below:

| Racemic solute | Mobile phase | Enantioselectivity $\alpha$ |
|---|---|---|
| Flavanone | Heptane/isopropanol 95/5 | 1.38 |
| Benzoin | Heptane/isopropanol 95/5 | 1.55 |

Example IV

Various CSPs were prepared starting from cellulose tris-2,3,6-(3,5-dimethylphenyl)carbamate, or CDMPC, which was synthesized as in step a/ of example I and from various solid substrates.

The solid substrates used are magnesium silicate and titanium dioxide. They are of chromatographic grade and consist of irregular particles from 5 to 15 µm having a pore diameter varying from 200 to 2000 Å.

The cellulose carbamate derivative obtained, or CDMPC, was deposited physically by evaporation from a tetrahydrofuran solution, at a content of 15 wt. % relative to the substrate.

After drying, each enantioselective chromatographic support obtained was conditioned in a chromatographic column with the dimensions 100×4.6 mm (length×inside diameter).

The various columns obtained were inserted one after another in high-performance liquid chromatography (HPLC) equipment, and the whole system was first stabilized in the following conditions:
- temperature 20° C.,
- elution flow rate 1 ml/min,
- detection wavelength 254 nm,
- eluting mobile phase: heptane/isopropanol 95/5.

Each column was tested in the same conditions with trans-stilbene oxide and benzoin as racemic solutes, for which the enantioselectivity $\alpha$ was measured in each case.

The results were as follows:

| Racemic solute | Solid substrate | Enantioselectivity $\alpha$ |
|---|---|---|
| Trans-stilbene oxide | Magnesium silicate | 1.78 |
| Trans-stilbene oxide | Titanium dioxide | 1.97 |
| Benzoin | Magnesium silicate | 1.35 |
| Benzoin | Titanium dioxide | 1.42 |

It can be seen from this example that for the same polysaccharide derivative (CDMPC), deposited at the same content (15 wt. %) relative to the inorganic substrate, the enantioselectivity of the CSP depends on the chemical nature of the substrate on which physical deposition is effected.

Example V

Various CSPs were prepared starting from cellulose tris-2, 3,6-(3,5-dimethylphenyl)carbamate, or CDMPC, which was synthesized as in step a/ of example I and from various solid substrates.

The solid substrates used were silica gel, magnesium silicate and zeolite.

The silica gel consists of irregular particles from 5 to 15 μm having a pore diameter varying from 200 to 2000 Å.

The magnesium silicate used is Florisil (Supelco catalogue/Aldrich reference 288705) sieved between 5 and 10 μm.

The zeolite is from FLUKA (reference 9606).

The cellulose carbamate derivative obtained, or CDMPC, was deposited physically by evaporation from a tetrahydrofuran solution, at a content of 15 wt. % relative to the silica gel and magnesium silicate substrate and at a content of 5 wt. % relative to the zeolite substrate.

After drying, each enantioselective chromatographic support obtained was conditioned in a chromatography column with dimensions 250×4.6 mm (length×inside diameter).

The various columns obtained were inserted one after another in high-performance liquid chromatography (HPLC) equipment, and the whole system was first stabilized in the following conditions:

temperature 20° C., elution flow rate 1 ml/min, detection wavelength 254 nm, eluting mobile phase: heptane/isopropanol 90/10.

Each column was tested in the same conditions with the various racemic solutes identified below, for which the enantioselectivity α was measured in each case.

The results are as follows:

| Racemic solute | Solid substrate | Enantioselectivity α |
| --- | --- | --- |
| Trans-stilbene oxide | Silica | 1.77 |
| Trans-stilbene oxide | Magnesium silicate | 1.78 |
| Flavanone | Silica | 1.30 |
| Flavanone | Zeolite | 1.38 |

Example VI

The procedure in example V was followed, except that a polystyrene/divinylbenzene from the company Purolite (5 μm/2000 Å) was used as the solid substrate.

The test conditions were identical to those described before, and the eluting mobile phase consisted of a heptane/isopropanol 90/10 mixture:

The enantioselectivity of benzoin was measured.

With the silica CSP the enantioselectivity α is 1.41.

With the polystyrene/divinylbenzene CSP the enantioselectivity α is 1.49.

Example VII

Enantioselective Solid Substrate According to the Fourth Embodiment of the Invention a/ Preparation of a mixed amylose tris-2,3,6-(3,5-dimethylphenyl carbamate and 4-vinylbenzoate)

Put 2.5 g of amylose (average degree of polymerization 100), 75 ml of pyridine and 38 ml of heptane in a reactor. The amylose is dehydrated by azeotropic entrainment. Cool the suspended medium, then add successively 6 g of 3,5-dimethylphenyl isocyanate and 3 g of 4-vinylbenzoyl chloride. After stirring for 1 hour, add 0.05 g of dimethylaminopyridine, and keep the medium under reflux for 24 h. Cool the solution obtained, then pour it onto 100 ml of methanol. Filter the solid obtained, wash it with 300 ml of methanol and then dry it at 50° C. to constant weight. 7.15 g of mixed amylose derivative tris-2,3,6-(3,5-dimethylphenyl carbamate and 4-vinylbenzoate) are obtained.

b/ Preparation of a CSP Based on Zeolite and a Mixed Amylose Carbamate and Benzoate Derivative Subsequently Crosslinked with Ethanedithiol Dehydrate 5 g of zeolite (from FLUKA, reference 9606) by azeotropic entrainment under reflux in 50 ml of toluene. Add 3 g of γ-mercaptopropyltrimethoxysilane in one go, and keep the reaction suspension under reflux for 72 hours. Filter the suspension and wash the solid with 2×50 ml of toluene. After drying at 60° C. under vacuum, 6.25 g of mercaptopropyl zeolite derivative is obtained.

Suspend 5 g of mercaptopropyl zeolite derivative in a solution containing 30 ml of tetrahydrofuran and 0.75 g of the compound obtained in a/ above. After stirring for 1 h, add 150 ml of heptane slowly over the space of 5 h. Filter the suspension then wash it with 2×30 ml of heptane.

Absorb the solid in 20 ml of tetrahydrofuran and 80 ml of heptane and add 2 ml of ethanedithiol as well as 10 mg of AIBN (azo-bis-isobutyronitrile). Keep the suspension under reflux for 10 minutes.

Filter the precipitate then wash it with 3×20 ml of boiling tetrahydrofuran then 3×20 ml of heptane.

Then suspend the solid in 30 ml of heptane and then condition it in a chromatographic column of 100 mm×4.6 mm (length×diameter). Condition the column in heptane/isopropanol 90/10 at a flow rate of 1 ml/mm and carry out detection at 254 nm. Inject 10 μg of racemic solutes. Calculate the enantioselectivity of the separation after measuring the chromatographic parameters and calculating the selectivity factor α.

| Racemic solute | Retention time 1 (min) | Retention time 2 (min) | Selectivity α |
| --- | --- | --- | --- |
| Trans-stilbene oxide | 3.95 | 4.43 | 1.50 |
| Benzoin | 6.04 | 6.63 | 1.19 |
| Flavonone | 10.25 | 11.74 | 1.21 |

Example VIII

Enantioselective Support According to the Third Embodiment of the Invention

Dehydrate 5 g of magnesium silicate (reference 288705, Florisil absorbent from the company SUPELCO) by azeotropic entrainment under reflux in 50 ml of toluene.

Preparation of a CSP based on magnesium silicate and a mixed carbamate and benzoate amylose derivative subsequently crosslinked with ethane dithiol.

The procedure is the same as before except that the mercaptopropyl zeolite derivative is replaced with magnesium silicate.

The column obtained is conditioned in pure chloroform. The eluting phase and pure chloroform which is percolated through the column at a flow rate of 1 ml/min.

The enantioselectivity of the separation is calculated after measuring chromatographic parameters and calculating the selectivity factor α.

| Racemic solute | Retention time 1 (min) | Retention time 2 (min) | Selectivity α |
|---|---|---|---|
| Methylphenylhydantoin | 12.93 | 17.97 | 1.48 |
| Ethylphenylhydantoin | 10.07 | 13.73 | 1.46 |

Example IX

Enantioselective Support According to the Second Embodiment of the Invention a/ Preparation of a tris-2,3,6-(3,5-dimethylphenyl carbamate and 4-vinylbenzoate) Mixed Amylose Put 2.5 g of amylose (average degree of polymerization 100), 75 ml of pyridine and 38 ml of heptane in a reactor. Dehydrate the amylose by azeotropic entrainment. Cool the medium in suspension, then add successively 6 g of 3,5-dimethylphenyl isocyanate and 3 g of 4-vinylbenzoyl chloride. After stirring for 1 h, add 0.05 g of dimethylaminopyridine and keep the medium under reflux for 24 h. Cool the solution obtained then pour it onto 100 ml of methanol. Filter the solid obtained then wash it with 300 ml of methanol and then dry at 50° C. to constant weight. 7.15 g of tris-2,3,6-(3,5-dimethylphenyl carbamate and 4-vinylbenzoate) mixed amylose derivative is obtained.

b/ Preparation of a CSP Based on Zeolite and a Mixed Amylose Carbamate and Benzoate Derivative Dehydrate 5 g of zeolite (from FLUKA, reference 9606) by azeotropic entrainment under reflux in 50 ml of toluene. Add 3 g of γ-mercapto-propyltricmethoxysilane in one go and keep the reaction suspension under reflux for 72 h. Filter the suspension and wash the solid with 2×50 ml toluene. After drying at 60° C. under vacuum, 6.25 g of mercaptopropyl zeolite derivative is obtained.

Suspend 5 g of mercaptopropyl zeolite derivative in a solution containing 30 ml of tetrahydrofuran and 0.45 g of the compound obtained in b/ above. After stirring for 1 h, add 150 ml of heptane slowly over the space of 5 hours. Filter the suspension then wash it with 2×30 ml heptane.

Absorb the solid in 20 ml of tetrahydrofuran and 80 ml of heptane and add 10 mg of AIBN (azo-bis-isobutyronitrile). Keep the suspension under reflux for 10 minutes.

Filter the precipitate then wash it with 3×20 ml of boiling tetrahydrofuran then 3×20 ml of heptane.

Then suspend the solid in 30 ml of heptane and then condition it in a chromatographic column of 100 mm×4.6 mm (length×diameter). Condition the column in pure chloroform at a flow rate of 1 ml/mm and carry out detection at 254 nm. Inject 10 μg of racemic solutes. Calculate the enantioselectivity of the separation after measuring the chromatographic parameters and calculating the selectivity factor α.

| Racemic solute | Retention time 1 (min) | Retention time 2 (min) | Selectivity α |
|---|---|---|---|
| Coumachlor | 3.29 | 5.51 | 3.63 |
| Warfarin | 3.11 | 4.52 | 3.14 |

The invention claimed is:

1. An optically active support material consisting of at least one ester derivative, and/or at least one carbamate derivative, and/or at least one mixed ester and carbamate derivative of polysaccharide or of oligosacoharide, and a solid substrate, of both organic and inorganic origin consisting of silica/dextran/titane oxide based composite.

2. The optically active support according to claim 1, wherein the solid substrate is in the form of particles having a diameter from 1 μm to 10 mm and pores with an opening diameter from 1 to 4000 Å.

3. The optically active support according to claim 1, wherein the ester derivative or derivatives and/or the carbamate derivative or derivatives and/or the mixed ester and carbamate derivative or derivatives of polysaccharide or of oligosacoharide have the following general formula:

PS—(OZ)$_n$ where

PS represents a polysaccharide or an oligosaccharide having at least 6 oside units, n varies from 12 to 30 000, each OZ group can represent, independently of one another, OH, —O—C(O)—NH—R or —O—C(O)—R, with R representing an aryl, alkaryl or aralkyl group having 1 to 40 carbon atoms, possibly substituted by at least one heteroatom selected from the group comprising sulfur, nitrogen, oxygen, phosphorus, chlorine, fluorine, bromine, iodine and silicon as well as conjugated system groups such as vinyl and allyloxyphenyls.

4. The support according to claim 3, wherein R is selected from the group comprising phenyl, tolyl, 3,5-dimethylphenyl, 4-chlorophenyl, 3,5-dichlorophenyl and 4-tert-butylphenyl.

5. The support according to claim 1, wherein the ester derivative or derivatives and/or the carbamate derivative or derivatives and/or the mixed ester and carbamate derivative or derivatives of polysaccharide or of oligosaccharide are derivatives of polysaccharide or of oligosaccharide selected from the group comprising cellulose, amylose, starch, chitosan, having an average degree of polymerization from 20 to 10000, and the α, β and γ-cyclodextrins.

6. The support according to claim 1, wherein the ester derivative or derivatives and/or the carbamate derivative or derivatives and/or the mixed ester and carbamate derivative or derivatives of polysaccharide or of oligosaccharide represent from 2 to 70% of the total mass.

7. The optically active support according to claim 1, wherein the ester derivative or derivatives and/or the carbamate derivative or derivatives and/or the mixed ester and carbamate derivative or derivatives of polysaccharide or of oligosaccharide are not bound by a covalent bond to the substrate of organic and inorganic origin and are not bound chemically to one another.

8. The optically active support according to claim 1, wherein the ester derivative or derivatives and/or the carbamate derivative or derivatives and/or the mixed ester and carbamate derivative or derivatives of polysaccharide or of oligosaccharide are bound by a covalent chemical bond to a substrate of organic and inorganic origin, the solid substrate possibly having previously been modified chemically with a bifunctional agent.

9. The optically active support according to claim 1, wherein the ester derivative or derivatives and/or the carbamate derivative or derivatives and/or the mixed ester and carbamate derivative or derivatives of polysaccharide or of oligosaccharide are not bound by a covalent bond to the substrate of organic and inorganic origin and are bound chemically to one another.

10. The optically active support according to claim 1, wherein the ester derivative or derivatives and/or the carbamate derivative or derivatives and/or the mixed ester and carbamate derivative or derivatives of polysaccharide or of oligosaccharide are bound by a covalent chemical bond to the substrate of organic and inorganic origin and are bound chemically to one another.

* * * * *

UNITED STATES PATENT AND TRADEMARK OFFICE
CERTIFICATE OF CORRECTION

PATENT NO.        : 7,597,804 B2
APPLICATION NO.   : 10/876777
DATED             : October 6, 2009
INVENTOR(S)       : Duval et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,597,804 B2 |
| APPLICATION NO. | : 10/876777 |
| DATED | : October 6, 2009 |
| INVENTOR(S) | : Raphael Duval et al. |

It is certified that error appears in the above-identified patent and that said Letters Patent is hereby corrected as shown below:

Claim 1, column 14, line 23

"oligosacoharide, and a solid substrate,"     should read

-- oligosaccharide, and a solid substrate --

Claim 3, column 14, line 34-35

" polysaccharide or of oligosacoharide have the following general formula:"     should read

-- polysaccharide or of oligosaccharide have the following general formula: --

Signed and Sealed this
Eighth Day of March, 2011

David J. Kappos
*Director of the United States Patent and Trademark Office*